(12) United States Patent
Fujie et al.

(10) Patent No.: US 7,988,776 B2
(45) Date of Patent: Aug. 2, 2011

(54) COLORING COMPOSITION, THERMAL TRANSFER RECORDING INK SHEET, THERMAL TRANSFER RECORDING METHOD, COLOR TONER, INKJET INK, COLOR FILTER, AND AZO DYE

(75) Inventors: Yoshihiko Fujie, Kanagawa (JP); Hisashi Mikoshiba, Kanagawa (JP); Naotsugu Muro, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 596 days.

(21) Appl. No.: 12/056,859

(22) Filed: Mar. 27, 2008

(65) Prior Publication Data

US 2008/0248202 A1    Oct. 9, 2008

(30) Foreign Application Priority Data

Mar. 30, 2007    (JP) .................... 2007-092233

(51) Int. Cl.
*C09D 11/02* (2006.01)
*C09B 29/036* (2006.01)
(52) U.S. Cl. ...................... 106/31.5; 534/753
(58) Field of Classification Search ............. 106/31.5; 534/753; 428/195.1; 430/7, 108.23, 200; 347/100
See application file for complete search history.

(56) References Cited

U.S. PATENT DOCUMENTS

| | | | |
|---|---|---|---|
| 3,515,715 A | | 6/1970 | Straley et al. |
| 3,639,384 A | * | 2/1972 | Weaver et al. ............... 534/788 |
| 4,065,447 A | * | 12/1977 | Jotterand ...................... 534/792 |
| 4,283,332 A | * | 8/1981 | Gourley ........................ 534/768 |
| 4,459,229 A | * | 7/1984 | Weaver et al. ................ 534/768 |
| 4,764,178 A | * | 8/1988 | Gregory et al. .................. 8/471 |
| 5,079,213 A | * | 1/1992 | Chapman et al. ............. 503/227 |
| 5,144,015 A | * | 9/1992 | Chapman ...................... 534/753 |
| 5,446,136 A | * | 8/1995 | Pape et al. .................... 534/753 |
| 6,200,371 B1 | * | 3/2001 | Meyrick et al. .............. 106/31.5 |
| 6,604,819 B2 | * | 8/2003 | Nishita ......................... 347/100 |
| 6,607,563 B2 | * | 8/2003 | Ohashi et al. ................. 534/753 |
| 7,141,657 B2 | * | 11/2006 | Fujita et al. .................. 534/753 |
| 2002/0049310 A1 | | 4/2002 | Tateishi et al. |
| 2008/0081279 A1 | * | 4/2008 | Fujie et al. ..................... 430/235 |

FOREIGN PATENT DOCUMENTS

| | | |
|---|---|---|
| DE | 43 43 454 A1 | 6/1995 |
| EP | 0 484 814 A | 5/1992 |
| EP | 0 492 444 A | 7/1992 |
| GB | 2 065 693 A | 7/1981 |

OTHER PUBLICATIONS

An Extended European Search Report dated Aug. 19, 2008.

* cited by examiner

*Primary Examiner* — Helene Klemanski
(74) *Attorney, Agent, or Firm* — Sughrue Mion, PLLC (57) ABSTRACT

A coloring composition containing an azo dye of the following formula (1):

wherein $R^1$, $R^2$, $R^3$ and $R^6$ represent a monovalent substituent; $R^5$ represents a hydrogen atom or a monovalent substituent; n is 0 to 4.

11 Claims, 1 Drawing Sheet

COLORING COMPOSITION, THERMAL TRANSFER RECORDING INK SHEET, THERMAL TRANSFER RECORDING METHOD, COLOR TONER, INKJET INK, COLOR FILTER, AND AZO DYE

BACKGROUND OF THE INVENTION

1. Field of the Invention

The present invention relates to a coloring composition containing a specific azo dye, a thermal transfer recording ink sheet, a thermal transfer recording method, a color toner, an inkjet ink, a color filter, and a specific novel azo dye.

2. Background Art

These days, in particular, a color image-forming material is the mainstream of an image-recording material; and concretely, inkjet-type recording materials, thermal transfer-type recording materials, electrophotographic recording materials, transfer-type silver halide photosensitive materials, printing inks and recording pens are much used. In an image sensor such as CCD as photography machinery and in LCD or PDP as displays, a color filter is used for recording and reproducing color images.

In a color image-recording material and a color filter, used are colorants (dyes, pigments) of three primary colors for an additive mixture process or a subtractive mixture process. At present, however, no one could find a fast colorant that has absorption characteristics capable of realizing a favorable color reproduction range and is durable to various conditions in practical use, and it is strongly desired to improve colorants.

Thermal transfer recording includes a recording system where a thermal transfer material having a thermofusible ink layer formed on a support (base film) is heated with a thermal head to thereby melt the ink for recording on an image-recording material, and a recording system where a thermal transfer material having a transferable dye-containing dye-donating layer formed on a support is heated with a thermal head to thereby thermally diffuse and transfer the dye onto an image-receiving material. In the latter thermal transfer system, the dye transfer rate may be varied by changing the energy to be applied to the thermal head, therefore facilitating gradation recording, and the system is especially advantageous for high-quality full-color recording. However, the transferable dye for use in this system has various limitations, and only an extremely few dyes are known capable of satisfying all the necessary performance requirements.

The performance requirements include, for example, spectral characteristics favorable for color reproduction, easy transferability, fastness to light and heat, fastness to various chemicals, easy producibility, and easy workability to construct thermal transfer recording materials. However, conventional specific dyes that have been proposed as those having spectral characteristics favorable for color reproduction and having fastness to light and heat (for example see Patent JP-A 1-225592 and JP-A 63-189289) could not be on a satisfactory level, and further improvements are strongly desired.

In color copiers and color laser printers to be driven by electrophotography, in general, a toner is widely used that comprises a colorant dispersed in resin particles. The performance requirements for the color toner include absorption characteristics capable of realizing a preferred color reproduction range, especially high transmittance (transparency) required in use in overhead projectors (hereinafter referred to as CHP), and various fastness requirements under environmental conditions in practical use. A toner comprising a pigment colorant dispersed in particles has been proposed (for example, see JP-A 62-157051, JP-A 62-255956 and JP-A 6-118715). The toner of the type may have excellent light fastness, but may readily aggregate as being insoluble and is problematic in point of the transparency reduction and the transmitted color shift. On the other hand, a toner comprising a specific dye as a colorant has also been proposed (for example, see JP-A 3-276161, JP-A 2-207274 and JP-A 2-207273), and the toner of the type has high transparency and is free from the problem of color shift contrary to the above, but is problematic in point of the light fastness.

An inkjet recording method has been rapidly popularized and is being developed further more, since its material cost is low, it enables high-speed recording, it is noiseless in recording operation, and it facilitates color recording.

The inkjet recording method includes a continuous system of continuously jetting out ink droplets and an on-demand system of jetting out ink droplets in accordance with image information signals; and the jetting system includes a system of jetting out ink droplets under pressure given thereto by a piezo device, a system of jetting out ink droplets by generating bubbles in ink by heat, a system of using ultrasonic waves, and a system of electrostatically sucking and jetting out ink droplets. As the inkjet recording ink, usable is water-base ink, oily ink, or solid (fusible) ink.

The requirements for the colorant to be used in the inkjet recording ink are that it well dissolves or disperses in solvent, it enables high-density recording, its color is good, it is fast to light, heat, active gases in the environment (e.g., oxidizing gas such as NOx, SOx, ozone), it is fast to water and chemicals, it may well fix in image-receiving material and hardly blurs it, it is well storable as ink, it is nontoxic, its purity is high, and it is inexpensive and easily available. However, it is extremely difficult to obtain a colorant that satisfies all these requirements at a high level. In particular, it is strongly desired to obtain a colorant that has a good magenta color tone, has high solubility, and is fast to light, humidity and heat, especially highly fast to light.

A color filter is required to have high transparency, for which, therefore, employed is a dyeing method of coloration with a dye. For example, a method that comprises patterning exposure and development of a dyeable photoresist to form a pattern, and then dyeing it with a filter color dye is successively repeated for all filter colors to produce a color filter. Apart form the dyeing method, a method of using a positive resist may also be employed for producing a color filter. The color filters produced according to these methods may have high transparency and excellent optical properties as using dyes, but their light fastness and heat resistance are limited. Accordingly, a colorant having excellent fastness and having high transparency is desired. On the other hand, A method of using an organic pigment having excellent light fastness and heat resistance in place of dye is widely known, but pigment-containing color filters could hardly have good optical properties like those of dye-containing color filters.

Common to those for use in the above-mentioned applications, the dyes are desired to have the following properties. Specifically, they have a color favorable for color reproduction, they have an optimum spectral absorption, their fastness such as light fastness, moisture fastness, chemical fastness is good, their solubility is high.

For use in thermal transfer recording, dyes having a specific pyrazolylazoaniline skeleton have been proposed (for example, see U.S. Pat. No. 4,764,178 and JP-A 4-265797). However, the dyes could not always satisfy the above-men- tioned requirements for their properties on a satisfactory level, and further investigations are desired.

SUMMARY OF THE INVENTION

An object of the invention is to provide a thermal transfer recording ink sheet and a thermal transfer recording method, in which an azo dye having excellent spectral characteristics with sharp absorption and having high fastness is used to satisfy all the requirements of excellent color reproducibility, image storability and transfer sensitivity in print samples. Another object of the invention is to provide the azo dye having excellent solubility. Still another object of the invention is to provide a color toner, an inkjet ink and a color filter comprising the azo dye. Still another object of the invention is to provide a novel azo dye having a specific substituent, which has especially excellent spectral characteristics with sharp absorption and has high fastness.

The present inventors have assiduously studied and, as a result, have found that the above-mentioned objects can be attained by the following constitution:

[1] A coloring composition containing an azo dye of the following formula (1):

(1)

wherein $R^1$, $R^2$, $R^3$ and $R^6$ each independently represent a monovalent substituent; $R^5$ represents a hydrogen atom or a monovalent substituent; n indicates an integer of from 0 to 4; when n is 2 or more, plural $R^3$'s may be the same or different; and $R^1$ and $R^2$ may bond to each other to form a cyclic structure.

[2] A thermal transfer recording ink sheet containing the azo dye of the above [1].

[3] A thermal transfer recording method comprising forming an image by use of the thermal transfer recording ink sheet of the above [2] on an image-receiving material comprising a polymer-containing ink-receiving layer on a support.

[4] A color toner containing the azo dye of the above [1].

[5] An inkjet ink containing the azo dye of the above [1].

[6] A color filter containing the azo dye of the above [1].

[7] An azo dye of the following formula (2):

(2)

wherein $R^1$, $R^2$, $R^3$, $R^4$ and $R^6$ each independently represent a monovalent substituent; $R^5$ represents a hydrogen atom or a monovalent substituent; m indicates an integer of from 0 to 3;

when m is 2 or more, plural $R^3$'s may be the same or different; and $R^1$ and $R^2$ may bond to each other to form a cyclic structure.

According to the invention, there are provided a novel azo dye satisfying all the requirements of excellent spectral characteristics with sharp absorption, high fastness and excellent transfer sensitivity; a thermal transfer recording ink sheet containing the azo dye; and a thermal transfer recording method using it. Unexpectedly, the novel azo dye has excellent solubility in solvent, and it greatly reduces the working load and the environmental load in ink sheet formation with it. Accordingly, the invention provides a thermal transfer recording ink sheet and a thermal transfer recording method capable of satisfying all the requirements of excellent color reproducibility, image storability and transfer sensitivity in print samples. Further, the invention provides a color toner, an inkjet ink and a color filter comprising the azo dye.

BEST MODE FOR CARRYING OUT THE INVENTION

The thermal transfer recording ink sheet, the color toner, the inkjet ink and the color filter and also the azo dye for use in these of the invention are described in detail hereinunder.

The description of the constitutive elements of the invention given hereinunder is for some typical embodiments of the invention, to which, however, the invention should not be limited. In this description, the numerical range expressed by the wording "a number to another number" means the range that falls between the former number indicating the lowermost limit of the range and the latter number indicating the uppermost limit thereof.

[Azo Dye of Formula (1)]

First described is the azo dye of formula (1) of the invention.

The azo dye of formula (1) (pyrazolylazoaniline dye) is a dye characterized by having a sulfonyl group introduced as a 1-positioned substituent of pyrazole. The azo dye having such a characteristic structure is described in U.S. Pat. No. 3,515, 715 as an example of synthetic intermediates therein; and no one knows at all the applicability of the azo dye having such a characteristic structure favorably to a coloring composition, a thermal transfer recording ink sheet, a thermal transfer recording method, a color toner, an inkjet ink, a color filter, etc. As compared with a dye having a hydrogen atom or an alkyl group as the 1-positioned substituent of pyrazole, the azo dye of formula (1) has overwhelmingly excellent light fastness. It may be because of the steric effect near the azo group or because of the oxidative fading retardation owing to the increase in the oxidation potential of the dye in which the sulfonyl group has an electron-attracting capability; but the details are unknown.

The azo dye of formula (1) has excellent solubility and light fastness and is favorable for thermal transfer recording ink sheets, and in addition, it may also be favorably used in other applications (for example, ink).

In formula (1), $R^1$ and $R^2$ each independently represent a monovalent substituent.

The substituent is not specifically defined. Its typical examples include an aliphatic group (e.g., alkyl group, alkenyl group, alkynyl group), an aryl group, a heterocyclic group, an acyl group, an aryloxycarbonyl group, an aliphatic oxycarbonyl group (e.g., alkoxycarbonyl group), a carbamoyl group; and these may be further substituted. The substituents for them are described separately.

$R^1$ and $R^2$ may bond to each other to form a cyclic structure. The cyclic structure is preferably a 5- to 7-membered cyclic structure, more preferably a 5- or 6-membered cyclic structure. Examples of the cyclic structure to be formed by $R^1$, $R^2$ and the nitrogen atom to which they bond include a pyrrolidine ring, a piperidine ring, a morpholine ring, preferably a piperidine ring, a morpholine ring.

In formula (1), $R^3$ represents a substituent, and $R^5$ represents a hydrogen atom or a substituent. The substituent for $R^3$ and $R^5$ is not specifically defined. Its typical examples include a halogen atom, an aliphatic group [a saturated aliphatic group (this means an alkyl group, or a cyclic saturated aliphatic group including a cycloalkyl group, a bicycloalkyl group, a crosslinked cyclic saturated hydrocarbon group, a spiro-saturated hydrocarbon group), an unsaturated aliphatic group (this means a linear unsaturated aliphatic group having a double bond or a triple bond, such as an alkenyl group, an alkynyl group; or a cyclic unsaturated aliphatic group including a cycloalkenyl group, a bicycloalkenyl group, a crosslinked cyclic unsaturated hydrocarbon group, a spiro-unsaturated hydrocarbon group)], an aryl group (preferably a phenyl group optionally having a substituent), a heterocyclic group (preferably a 5- to 8-membered, alicyclic, aromatic or heterocyclic ring having an oxygen atom, a sulfur atom or a nitrogen atom as the ring-constitutive atom, and it may be a condensed ring), a cyano group, an aliphatic oxy group (typically an alkoxy group), an aryloxy group, an acyloxy group, a carbamoyloxy group, an aliphatic oxycarbonyloxy group (typically an alkoxycarbonyloxy group, an aryloxycarbonyloxy group), an amino group [including an aliphatic amino group (typically an alkylamino group), an anilino group, a heterocyclic amino group], an acylamino group, an aminocarbonylamino group, an aliphatic oxycarbonylamino group (typically an alkoxycarbonylamino group), an aryloxycarbonylamino group, a sulfamoylamino group, an aliphatic (typically an alkyl) or aryl sulfonylamino group, an aliphatic thio group (typically an alkylthio group), an arylthio group, a sulfamoyl group, an aliphatic (typically an alkyl) or arylsulfinyl group, an aliphatic (typically an alkyl) or arylsulfonyl group, an acyl group, an aryloxycarbonyl group, an aliphatic oxycarbonyl group (typically an alkoxycarbonyl group), a carbamoyl group, an aryl or heterocyclic azo group, an aliphatic oxysulfonyl group (typically an alkoxysulfonyl group), an aryloxysulfonyl group, a halogen atom, a hydroxyl group, a nitro group, a carboxyl group, a sulfo group. These groups may be further substituted (for example, with the substituent mentioned in the above for $R^3$).

In formula (1), $R^6$ represents a substituent. The substituent is not specifically defined. Its typical examples include the substituents mentioned in the above for $R^3$, especially an aliphatic group (typically an alkyl group, an alkenyl group, an alkynyl group, a cycloalkyl group, a cycloalkenyl group), an aryl group, a heterocyclic group, an amino group [including an amino group, an aliphatic amino group (typically an alkylamino group), an anilino group, a heterocyclic amino group]; and these groups may be further substituted (for example, with the substituent mentioned in the above for $R^3$).

The substituents of $R^1$, $R^2$, $R^3$, $R^5$ and $R^6$, and the substituents which these groups may optionally have are described in more detail hereinunder.

The halogen atom includes a fluorine atom, a chlorine atom, a bromine atom and an iodine atom. Above all, preferred are a Chlorine atom and a bromine atom; and more preferred is a chlorine atom.

The aliphatic group is a linear, branched or cyclic aliphatic group; and as so mentioned in the above, the saturated aliphatic group includes an alkyl group, a cycloalkyl group, a bicycloalkyl group; and these may be further substituted. Preferably, the number of the carbon atoms constituting the group is from 1 to 30. Its examples include a methyl group, an ethyl group, an n-propyl group, an isopropyl group, a tert-butyl group, an n-octyl group, an eicosyl group, a 2-chloroethyl group, a 2-cyanoethyl group, a benzyl group, a 2-ethylhexyl group. The cycloalkyl group includes a substituted or unsubstituted cycloalkyl group. For the substituted or unsubstituted cycloalkyl group, the cycloalkyl group preferably has from 3 to 30 carbon atoms. Its examples include a cyclohexyl group, a cyclopentyl groups a 4-n-dodecylcyclohexyl group. The bicycloalkyl group is a substituted or unsubstituted bicycloalkyl group having from 5 to 30 carbon atoms, or that is, a monovalent group derived from a bicycloalkane having from 5 to 30 carbon atoms by removing one hydrogen atom therefrom. Its examples include a bicyclo[1.2.2]heptan-2-yl group, a bicyclo[2.2.2]octan-3-yl group. It further includes a tricyclo structure and more multi-cyclo structures.

The unsaturated aliphatic group is a linear, branched or cyclic unsaturated aliphatic group, including an alkenyl group, an cycloalkenyl group, a bicycloalkenyl group, an alkynyl group. The alkenyl group is a linear, branched or cyclic, substituted or unsubstituted alkenyl group. Preferably, the alkenyl group is an unsubstituted or substituted alkenyl group having from 2 to 30 carbon atoms. Its examples include a vinyl group, an allyl group, a prenyl group, a geranyl group, an oleyl group. The cycloalkenyl group is preferably a substituted or unsubstituted cycloalkenyl group having from 3 to 30 carbon atoms, or that is, a monovalent group derived from a cycloalkene having from 3 to 30 carbon atoms by removing one hydrogen atom therefrom. Its examples include a 2-cyclopenten-1-yl group, a 2-cyclohexen-1-yl group. The bicycloalkenyl group includes a substituted or unsubstituted bicycloalkenyl group. The bicycloalkenyl group is preferably a substituted or unsubstituted bicycloalkenyl group having from 5 to 30 carbon atoms, or that is, a monovalent group derived from a bicycloalkene having one double bond by removing one hydrogen atom therefrom. Its examples include a bicyclo[2.2.1]hept-2-en-1-yl group, a bicyclo[2.2.2]oct-2-en-4-yl group. The alkynyl group is preferably a substituted or unsubstituted alkynyl group having from 2 to 30 carbon atoms, including, for example, an ethynyl group, a propargyl group.

The aryl group is preferably a substituted or unsubstituted aryl group having from 6 to 30 carbon atoms, including, for example, a phenyl group, a p-tolyl group, a naphthyl group, a m-chlorophenyl group, an o-hexadecanoylaminophenyl group. Preferred is a phenyl group optionally having a substituent.

The heterocyclic group is a monovalent group derived from a substituted or unsubstituted, aromatic or non-aromatic heterocyclic compound by removing one hydrogen atom therefrom, and it may form a condensed ring. The heterocyclic group is preferably a 5- or 6-membered heterocyclic group, and the ring-constituting hetero atom is preferably an oxygen atom, a sulfur atom, a nitrogen atom. More preferably, it is a 5- or 6-membered aromatic heterocyclic group having from 3 to 30 carbon atoms. The hetero ring of the heterocyclic group includes a pyridine ring, a pyrazine ring, a pyridazine ring, a pyrimidine ring, a triazine ring, a quinoline ring, an isoquinoline ring, a quinazoline ring, a cinnoline ring, a phthalazine ring, A quinoxaline ring, a pyrrole ring, an indole ring, a furan ring, a benzofuran ring, a thiophene ring, a benzothiophene ring, a pyrazole ring, an imidazole ring, a benzimidazole ring, a triazole ring, an oxazole ring, a benzoxazole ring, a thiazole ring, a benzothiazole ring, an isothiazole ring, a benzisothiazole ring, a thiadiazole ring, an isoxazole ring, a benzisoxazole ring, a pyrrolidine ring a piperidine ring, a piperazine ring, an imidazolidine ring, a thiazoline ring.

The aliphatic oxy group (typically alkoxy group) includes a substituted or unsubstituted aliphatic oxy group (typically alkoxy group), and preferably has from 1 to 30 carbon atoms. For example, it includes a methoxy group, an ethoxy group, an isopropoxy group, an n-octyloxy group, a methoxyethoxy group, a hydroxyethoxy group, a 3-carboxypropoxy group.

The aryloxy group is preferably a substituted or unsubstituted aryloxy group having from 6 to 30 carbon atoms. Examples of the aryloxy group include a phenoxy group, a 2-methylphenoxy group, a 4-tert-butylphenoxy group, a 3-nitrophenoxy group, a 2-tetradecanoylaminophenoxy group. Preferred is a phenyloxy group optionally having a substituent.

The acyloxy group is preferably a formyloxy group, a substituted or unsubstituted alkylcarbonyloxy group having from 2 to 30 carbon atoms, or a substituted or unsubstituted arylcarbonyloxy group having from 6 to 30 carbon atoms. Examples of the acyloxy group include a formyloxy group, an acetyloxy group, a pivaloyloxy group, a stearoyloxy group, a benzoyloxy group, a p-methoxyphenylcarbonyloxy group.

The carbamoyloxy group is preferably a substituted or unsubstituted carbamoyloxy group having from 1 to 30 carbon atoms. Examples of the carbamoyloxy group include an N,N-dimethylcarbamoyloxy group, an N,N-diethylcarbamoyloxy group, a morpholinocarbonyloxy group, an N,N-di-n-octylaminocarbonyloxy group an N-n-octylcarbamoyloxy group.

The aliphatic oxycarbonyloxy group (typically alkoxycarbonyloxy group) preferably has from 2 to 30 carbon atoms, and it may have a substituent. For example, it includes a methoxycarbonyloxy group, an ethoxycarbonyloxy group, a tert-butoxycarbonyloxy group, an n-octylcarbonyloxy group.

The aryloxycarbonyloxy group is preferably a substituted or unsubstituted aryloxycarbonyloxy group having from 7 to 30 carbon atoms. Examples of the aryloxycarbonyloxy group include a phenoxycarbonyloxy group, a p-methoxyphenoxycarbonyloxy group, a p-n-hexadecyloxyphenoxycarbonyloxy group. Preferred is a phenoxycarbonyloxy group optionally having a substituent.

The amino group includes an amino group, an aliphatic amino group (typically an alkylamino group) an arylamino group and a heterocyclic amino group. The amino group is preferably a substituted or unsubstituted aliphatic amino group (typically an alkylamino group) having from 1 to 30 carbon atoms, or a substituted or unsubstituted arylamino group having from 6 to 30 carbon atoms. Examples of the amino group include an amino group, a methylamino group, a dimethylamino groups an anilino group, an N-methylanilino group, a diphenylamino group, a hydroxyethylamino group, a carboxyethylamino group, a sulfoethylamino group, a 3,5-dicarboxyanilino group, a 4-quinolylamino group.

The acylamino group is preferably a formylamino group, a substituted or unsubstituted alkylcarbonylamino group having from 1 to 30 carbon atoms, or a substituted or unsubstituted arylcarbonylamino having from 6 to 30 carbon atoms. Examples of the acylamino group include a formylamino group, an acetylamino group, a pivaloylamino group, a lauroylamino group, a benzoylamino group, a 3,4,5-tri-n-octyloxyphenylcarbonylamino group.

The aminocarbonylamino group is preferably a substitute or unsubstituted aminocarbonylamino group having from 1 to 30 carbon atoms. Examples of the aminocarbonylamino group include a carbamoylamino group, an N,N-dimethylaminocarbonylamino group, an N,N-diethylaminocarbonylamino group, a morpholinocarbonylamino group. The term "amino" in this group has the same meaning as that of the "amino" in the above-mentioned amino group.

The aliphatic oxycarbonylamino group (typically alkoxycarbonylamino group) preferably has from 2 to 30 carbon atoms, and may have a substituent. For example, it includes a methoxycarbonylamino group, an ethoxycarbonylamino group, a tert-butoxycarbonylamino group, an n-octadecyloxycarbonylamino group, an N-methyl-methoxycarbonylamino group.

The aryloxycarbonylamino group is preferably a substituted or unsubstituted aryloxycarbonylamino group having from 7 to 30 carbon atoms. Examples of the aryloxycarbonylamino group include a phenoxycarbonylamino group, a p-chlorophenoxycarbonylamino group, a m-n-octyloxyphenoxycarbonylamino group. Preferred is a phenyloxycarbonylamino group optionally having a substituent.

The sulfamoylamino group is preferably a substituted or unsubstituted sulfamoylamino group having from 0 to 30 carbon atoms. Examples of the sulfamoylamino group include a sulfamoylamino group, an N,N-dimethylaminosulfonylamino group, an N-n-octylaminosulfonylamino group.

The aliphatic (typically alkyl) or arylsulfonylamino group is preferably a substituted or unsubstituted aliphatic sulfonylamino group (typically an alkylsulfonylamino group) having from 1 to 30 carbon atoms, a substituted or unsubstituted arylsulfonylamino group having from 6 to 30 carbon atoms (preferably a phenylsulfonylamino group optionally having a substituent). For example, it includes a methylsulfonylamino group, a butylsulfonylamino group, a phenylsulfonylamino group, a 2,3,5-trichlorophenylsulfonylamino group, a p-methylphenylsulfonylamino group.

The aliphatic thio group (typically alkylthio group) is preferably a substituted or unsubstituted alkylthio group having from 1 to 30 carbon atoms. Examples of the alkylthio group include a methylthio group, an ethylthio group, an n-hexadecylthio group.

The sulfamoyl group is preferably a substituted or unsubstituted sulfamoyl group having from 0 to 30 carbon atoms. Examples of the sulfamoyl group include an N-ethylsulfamoyl group, an N-(3-dodecyloxypropyl)sulfamoyl group, an N,N-dimethylsulfamoyl group, an N-acetylsulfamoyl group, an N-benzoylsulfamoyl group, an N—(N'-phenylcarbamoyl) sulfamoyl group.

The aliphatic (typically alkyl) or arylsulfinyl group is preferably a substituted or unsubstituted aliphatic sulfinyl group (typically an alkylsulfinyl group) having from 1 to 30 carbon atoms, a substituted or unsubstituted arylsulfinyl group having from 6 to 30 carbon atoms (preferably a phenylsulfinyl group optionally having a substituent). For example, it includes a methylsulfinyl group, an ethylsulfinyl group, a phenylsulfinyl group, a p-methylphenylsulfinyl group.

The aliphatic (typically alkyl) or arylsulfonyl group is preferably a substituted or unsubstituted aliphatic sulfonyl group (typically an alkylsulfonyl group) having from 1 to 30 carbon atoms, a substituted or unsubstituted arylsulfonyl group having from 6 to 30 carbon atoms (preferably a phenylsulfonyl group optionally having a substituent). For example, it includes a methylsulfonyl group, an ethylsulfonyl group, a phenylsulfonyl group, a p-toluenesulfonyl group.

The acyl group is preferably a formyl group, a substituted or unsubstituted aliphatic carbonyl group (typically an alkylcarbonyl group) having from 2 to 30 carbon atoms, a substituted or unsubstituted arylcarbonyl group having from 7 to 30 carbon atoms (preferably a phenylcarbonyl group optionally having a substituent), a substituted or unsubstituted heterocyclic carbonyl group having from 4 to 30 carbon atoms in which the ring bonds to the carbonyl group via its carbon atoms. For example, it includes an acetyl group, a pivaloyl group, a 2-chloroacetyl group, a stearoyl group, a benzoyl group, a p-n-octyloxyphenylcarbonyl group, a 2-pyridylcarbonyl group, a 2-furylcarbonyl group.

The aryloxycarbonyl group is preferably a substituted or unsubstituted aryloxycarbonyl group having from 7 to 30 carbon atoms. Examples of the aryloxycarbonyl group include a phenoxycarbonyl group, an o-chlorophenoxycarbonyl group, an m-nitrophenoxycarbonyl group, a p-tert-butylphenoxycarbonyl group. Preferred is a phenyloxycarbonyl group optionally having a substituent.

The aliphatic oxycarbonyl group (typically alkoxycarbonyl group) preferably has from 2 to 30 carbon atoms, and may have a substituent. For example, it includes a methoxycarbonyl group, an ethoxycarbonyl group, a tert-butoxycarbonyl group, an n-octadecyloxycarbonyl group.

The carbamoyl group is preferably a substituted or unsubstituted carbamoyl group having from 1 to 30 carbon atoms. Examples of the carbamoyl group include a carbamoyl group, an N-methylcarbamoyl group, an N,N-dimethylcarbamoyl group, an N,N-di-n-octylcarbamoyl group, an N-(methylsulfonyl)carbamoyl group.

The aryl or heterocyclic azo group includes, for example, a phenylazo group, a 4-methoxyphenylazo group, a 4-pivaloylaminophenylazo group, a 2-hydroxy-4-propanoylphenylazo group.

The imido group includes, for example, an N-succinimide group, an N-phthalimide group.

In addition to these, further mentioned are a hydroxyl group, a cyano group, a nitro group, a sulfo group, a carboxyl group.

These groups may be further substituted, and the substituents for them may be the above-mentioned substituents.

Preferably, $R^1$ and $R^2$ each independently represent a substituted or unsubstituted aliphatic group having from 1 to 20 carbon atoms (typically an alkyl group, an alkenyl group, a cycloalkyl group, more preferably an alkyl group), a substituted or unsubstituted aryl group (preferably a phenyl group optionally having a substituent), a substituted or unsubstituted heterocyclic group, more preferably a substituted or unsubstituted aliphatic group having from 1 to 10 carbon atoms (preferably an alkyl group, an alkenyl group, a cycloalkenyl group, more preferably an alkyl group), a substituted or unsubstituted aryl group, most preferably an unsubstituted alkyl group having from 1 to 4 carbon atoms.

$R^3$ is preferably a substituted or unsubstituted aliphatic group having from 1 to 10 carbon atoms (preferably an alkyl group, an alkenyl group, a cycloalkyl group, more preferably an alkyl group), a substituted or unsubstituted aryl group (preferably a phenyl group optionally having a substituent), a substituted or unsubstituted aliphatic oxy group having from 1 to 10 carbon atoms (preferably an alkoxy group, an alkenoxy group, a cycloalkoxy group, more preferably an alkoxy group), or a substituted or unsubstituted amino group (preferably an alkylamino group, an arylamino group, an acylamino group, more preferably an acylamino group), more preferably a substituted or unsubstituted alkyl group having from 1 to 5 carbon atoms, a substituted or unsubstituted alkoxy group having from 1 to 5 carbon atoms, a substituted or unsubstituted acylamino group having from 1 to 5 carbon atoms, most preferably an unsubstituted alkoxy group having from 1 to 3 carbon atoms or an acylamino group having from 1 to 4 carbon atoms.

$R^5$ is preferably a substituted or unsubstituted aliphatic group having from 1 to 20 carbon atoms (preferably an alkyl group, an alkenyl group, a cycloalkyl group, more preferably an alkyl group), a substituted or unsubstituted aryl group (preferably a phenyl group optionally having a substituent), more preferably a substituted or unsubstituted aliphatic group having from 3 to 10 carbon atoms (preferably an alkyl group, an alkenyl group, a cycloalkyl group, more preferably an alkyl group), most preferably a tert-butyl group.

$R^6$ is preferably a substituted or unsubstituted aliphatic group having from 1 to 20 carbon atoms (preferably an alkyl group, an alkenyl group, a cycloalkyl group, more preferably an alkyl group), a substituted or unsubstituted aryl group (preferably a phenyl group optionally having a substituent), more preferably a substituted or unsubstituted aliphatic group having from 1 to 10 carbon atoms (preferably an alkyl group, an alkenyl group, a cycloalkyl group, more preferably an alkyl group), a substituted or unsubstituted aryl group, most preferably a substituted or unsubstituted alkyl group having from 1 to 4 carbon atoms or a substituted or unsubstituted aryl group.

Regarding the preferred combination of the substituents (combination of $R^1$, $R^2$, $R^3$, $R^5$ and $R^6$) in the dye of formula (1) of the invention, it is desirable that at least one of these substituent is the above-mentioned preferable group, more preferably more various substituents are the above-mentioned preferred groups, most preferably all the substituents are the above-mentioned preferred groups.

One preferred combination is that $R^1$ is a substituted or unsubstituted alkyl group having from 1 to 4 carbon atoms, $R^2$ is a substituted or unsubstituted alkyl group having from 1 to 4 carbon atoms, $R^3$ is an acylamino group, $R^5$ is a substituted or unsubstituted alkyl group having from 1 to 4 carbon atoms, $R^6$ is a substituted or unsubstituted alkyl group having from 1 to 4 carbon atoms, or a substituted or unsubstituted aryl group, and n=1 (in which the substituting position of $R^3$ is preferably an ortho position relative to the azo group).

A more preferred combination is that $R^1$ is a substituted or unsubstituted alkyl group having from 1 to 4 carbon atoms, $R^2$ is a substituted or unsubstituted alkyl group having from 1 to 4 carbon atoms, $R^3$ is an acylamino group, $R^5$ is a tert-butyl group, $R^6$ is a substituted or unsubstituted alkyl group having from 1 to 4 carbon atoms, or a substituted or unsubstituted aryl group, and n=1 (in which the substituting position of $R^3$ is preferably an ortho position relative to the azo group).

A most preferred combination is that $R^1$ is a substituted or unsubstituted alkyl group having from 1 to 4 carbon atoms, $R^2$ is a substituted or unsubstituted alkyl group having from 1 to 4 carbon atoms, $R^3$ is an acylamino group, $R^5$ is a tert-butyl group, $R^6$ is a substituted or unsubstituted alkyl group having from 1 to 2 carbon atoms, or a substituted or unsubstituted phenyl group, and n=1 (in which the substituting position of $R^3$ is preferably an ortho position relative to the azo group); or the azo dye of formula (2).

The molecular weight of the azo dye of formula (1) is preferably at most 550, more preferably at most 500 from the viewpoint of the thermal diffusibility thereof.

[Azo Dye of Formula (2)]

The azo dye of formula (2) is described in detail hereinunder.

The azo dye of formula (2) is characterized in that, in addition to the characteristic structure of the azo dye of formula (1), the aniline group has a substituted amino group as the substituent; and the dye having those characteristics are quite unknown up to the present. The azo dye of formula (2) having the characteristics has a sharper absorption and is faster than the azo dye of formula (1). Accordingly, the dye of formula (2), falling within the scope of the dye of formula (1), is especially more favorable for use in the above-mentioned thermal transfer recording ink sheet, and, in addition, it is also favorable for other applications (e.g., ink).

In formula (2), $R^1$, $R^2$, $R^3$, $R^5$ and $R^6$ have the same meanings as those of $R^1$, $R^2$, $R^3$, $R^5$ and $R^6$ in formula (1). Preferred examples of $R^1$, $R^2$, $R^5$ and $R^6$ are also the same as those of the latter. In formula (2), m indicates an integer of from 0 to 3, and m is preferably 0.

In formula (2), $R^4$ represents a monovalent substituent. The monovalent substituent is not specifically defined. Its typical examples include an aliphatic group (e.g., an alkyl group, an alkenyl group, an alkynyl group), an aryl group, a heterocyclic group, an acyl group, an aryloxycarbonyl group, an aliphatic oxycarbonyl group (e.g., an alkoxycarbonyl group), a carbamoyl group. These groups may be further substituted.

Preferably, it is a substituted or unsubstituted acyl group having from 1 to 8 carbon atoms, more preferably an unsubstituted acyl group having from 1 to 6 carbon atoms, most preferably an unsubstituted acyl group having from 1 to 4 carbon atoms.

Regarding the preferred combination of the substituents (combination of $R^1$ to $R^6$) in the dye of formula (2) of the invention, it is desirable that at least one of these substituent is the above-mentioned preferable group, more preferably more various substituents are the above-mentioned preferred groups, most preferably all the substituents are the above-mentioned preferred groups.

One preferred combination is that $R^1$ is a substituted or unsubstituted alkyl group having from 1 to 4 carbon atoms, $R^2$ is a substituted or unsubstituted alkyl group having from 1 to 4 carbon atoms, $R^4$ is an acyl group, $R^5$ is a substituted or unsubstituted alkyl group having from 1 to 4 carbon atoms, $R^6$ is a substituted or unsubstituted alkyl group having from 1 to 4 carbon atoms, or a substituted or unsubstituted aryl group, and m=0.

A more preferred combination is that $R^1$ is a substituted or unsubstituted alkyl group having from 1 to 4 carbon atoms, $R^2$ is a substituted or unsubstituted alkyl group having from 1 to 4 carbon atoms, $R^4$ is an acyl group, $R^5$ is a tert-butyl group, $R^6$ is a substituted or unsubstituted alkyl group having from 1 to 4 carbon atoms, or a substituted or unsubstituted aryl group, and m=0.

A most preferred combination is that $R^1$ is a substituted or unsubstituted alkyl group having from 1 to 4 carbon atoms, $R^2$ is a substituted or unsubstituted alkyl group having from 1 to 4 carbon atoms, $R^4$ is an acyl group, $R^5$ is a tert-butyl group, $R^6$ is a substituted or unsubstituted alkyl group having from 1 to 2 carbon atoms, or a substituted or unsubstituted phenyl group, and m=0.

Specific examples of the azo dye of formula (1) of the invention are shown below; however, the azo dye of formula (1) for use in the invention should not be limitatively interpreted by the following examples. In the following examples, Ph means a phenyl group ($-C_6H_5$).

(1)

(2)

(3)

(4)

(5)

(6)

(7)

(8)

(9)

(10)

The above compounds (1) to (8) are examples of the azo dye of formula (2); and the above compounds (9) and (10) are similar to the synthetic intermediates described in U.S. Pat. No. 3,515,715.

These azo dyes may be produced through general diazo coupling followed by N-sulfonylation with sulfonyl chloride.

Concretely, the amino group of an aminopyrazole derivative of the following formula (3) is converted into a diazonium salt as in the following formula (4), using a diazonating agent, then the diazonium salt is coupled with an aniline derivative of the following formula (5), thereby obtaining a compound of the following formula (6). Afterwards, the compound of formula (6) is N-sulfonylated with a compound of the following formula (7) under a basic condition, thereby readily producing the intended dye compound. The process is concretely demonstrated in Examples given hereinunder.

(3)

(4)

(5)

(6)

(7)

(In the formulae, $R^1$ to $R^6$ have the same meanings as those of $R^1$ to $R^6$ in the above-mentioned formula (1). $X^1$ represents a counter anion of the diazonium, salt of formula (4); and $X^2$ represents a halogen atom.)

Many of the compounds of formulae (5) and (7) are readily available as commercial products (e.g., Wako Pure Chemicals' catalogue Nos. 329-30252, 135-01586). The compound of formula (3) may be produced according to the method described in J. Am. Chem. Soc., 124, 41, p. 12118, 2002.

The azo dye of the invention is preferably used as a magenta color of three primary colors.

The maximum absorption wavelength of the azo dye of the invention preferably falls within a range of from 480 to 580 nm, more preferably from 510 to 550 nm.

[Coloring Composition]

The coloring composition of the invention is characterized by containing the dye of formula (1) of the invention. The coloring composition in this description is directed to thermal transfer recording ink sheets, inkjet inks, color toners, color filters, writing pens, color plastics, and other ink liquids.

The coloring composition of the invention is especially effectively used for thermal transfer recording ink sheets, inkjet inks, color toners, and color filters.

[Thermal Transfer Recording Ink Sheet]

The thermal transfer recording ink sheet of the invention is characterized by containing the dye of formula (1). The thermal transfer recording ink sheet generally has a structure with a dye-donating layer formed on a support, in which the dye-donating layer contains a dye of formula (1). The thermal transfer recording ink sheet of the invention may be produced as follows: A dye of formula (1) is dissolved in a solvent along with a binder therein or dispersed as particles in a solvent, thereby preparing an ink liquid, then the ink liquid is applied onto a support and suitably dried to form a dye-donating layer thereon.

As the support of the thermal transfer recording ink sheet of the invention, any ordinary one heretofore used as a support for ink sheets may be suitably selected and used. For example, the material described in JP-A 7-137466, paragraph [0050] may be favorably used. The thickness of the support is preferably from 2 to 30 μm.

Not specifically defined, the binder resin usable in the dye-donating layer of the thermal transfer recording ink sheet of the invention may be any one having high heat resistance and not interfering with the transference of the dye into an image-receiving material when heated. For example, its preferred examples are described in JP-A 7-137466, paragraph [0049]. The solvent for dye-donating layer formation may also be any conventional known one; and those described in JP-A 7-137466, Examples are favorably used also herein.

The content of the dye of formula (1) in the dye-donating layer is preferably from 0.03 to 1.0 g/m² more preferably from 0.1 to 0.6 g/m² The thickness of the dye-donating layer is preferably from 0.2 to 5 an, more preferably from 0.4 to 2 µm.

The thermal transfer recording ink sheet of the invention may have any other layer than the dye-donating layer within a range not too much detracting from the effect of the invention. For example, an interlayer may be provided between the support and the dye-donating layer; or a back layer may be provided on the surface of the support opposite to the side of the dye-donating layer (this is hereinafter referred to as "back surface"). The interlayer includes, for example, an undercoating layer, and a diffusion-preventing layer for preventing the dye from diffusing toward the support (hydrophilic barrier layer). The back layer is, for example, a heat-resistant slip layer, which is for preventing a thermal head from sticking to the ink sheet.

In case where the invention is applied to thermal transfer recording material that enables full-color image recording, it is desirable that a cyan ink sheet containing a thermal diffusible cyan dye capable of forming cyan images, a magenta ink sheet containing a thermal diffusible magenta dye capable of forming magenta images, and a yellow ink sheet containing a thermal diffusible yellow dye capable of forming yellow images are formed successively on a support. If desired, an ink sheet containing a black image-forming substance may be further formed.

As the thermal diffusible cyan dye-containing cyan ink sheet for forming cyan images, for example, preferably used are those described in JP-A 3-103477, 3-150194. As the thermal diffusible yellow dye-containing yellow ink sheet for forming yellow images, for example, preferably used are those described in JP-A 1-225592.

[Thermal Transfer Recording]

In thermal transfer recording by the use of the thermal transfer recording ink sheet of the invention, a heating unit such as a thermal head and an image-receiving material are used as combined. Specifically, heat energy is applied to the ink sheet from a thermal head according to an image recording signal, and the dye in the part having received the heat energy is transferred to and fixed in an image-receiving material to attain image recording. The image-receiving material generally has a constitution with a polymer-containing ink-receiving layer formed on a support. As the constitution and the constitutive components of the image-receiving material, for example, preferably used are those described in JP-A 7-137466, paragraphs [0056] to [0074].

[Color Toner]

The color toner of the invention is characterized by containing the dye of formula (1). As the binder resin for color toner into which the dye (preferably azo dye) of formula (1) of the invention is introduced, usable is any and every binder for general use in toner. For example, it includes styrene resin, acrylic resin, styrene/acrylic resin, polyester resin. For the purpose of improving the flowability of the toner and for static control thereof, an inorganic fine powder or organic fine particles may be added to the toner as external additives. Preferably used are silica particles and titania particles of which the surfaces are processed with an alkyl group-containing coupling agent or the like. Preferably, the particles have a number-average primary particle size of from 10 to 500 nm; and also preferably, the particles are added to the toner in an amount of from 0.1 to 20% by mass.

As the lubricant, any and every lubricant heretofore used in toner may be used herein. Concretely, it includes olefins such as low-molecular-weight polypropylene, low-molecular-weight polyethylene, ethylene-propylene copolymer; and microcrystalline wax, carnauba wax, Sasol wax, paraffin wax. Preferably, the lubricant is added to the toner in an amount of from 1 to 5% by mass.

If desired, a charge-controlling agent may be added to the toner, and it is preferably colorless from the viewpoint of the colorability of the toner. For example, herein usable are those having a quaternary ammonium salt structure or a calixarene structure.

The carrier may be any of a non-coated carrier formed of magnetic material particles alone of iron, ferrite or the like; or a resin-coated carrier prepared by coating the surfaces of magnetic material particles with resin or the like. Regarding the mean particle size thereof, the carrier preferably has a volume-average particle size of from 30 to 150 µm.

The image-forming method to which the toner of the invention is applicable is not specifically defined. For example, the toner is applicable to an image-forming method that comprises repeatedly forming a color image on a photoreceptor followed by transferring it; and a color image-forming method that comprises transferring an image formed on a photoreceptor successively onto an intermediate transfer medium thereby forming a color image on the intermediate transfer medium, followed by transferring the image onto an image-forming member such as paper.

[Inkjet Ink]

The inkjet ink of the invention is characterized by containing the dye of formula (1). The ink of the invention may be produced by dissolving and/or dispersing the dye of formula (1) in an oleophilic medium or an aqueous medium, and preferably an aqueous medium is used. The ink of the invention contains the dye having excellent spectral characteristics and fastness as so mentioned in the above, and is therefore favorably used as an inkjet recording ink. If desired, other additives may be added to the ink within a range not detracting from the effect of the invention. The additives may be known additives, including, for example, a drying inhibitor (wetting agent), an antifading agent, a emulsion stabilizer, a penetration promoter, a UV absorbent, a preservative, an antifungal agent, a pH controlling agent, a surface tension controlling agent, a defoaming agent, a viscosity controlling agent, a dispersant, a dispersion stabilizer, a rust inhibitor, a chelating agent. In general, these various additives are added to the dye dispersion after its preparation, but as the case may be, they may be added to an oily phase or an aqueous phase in preparing the dye dispersion.

The drying inhibitor is favorably used for the purpose of preventing the inkjet ink from drying at the ink-jetting orifice of the nozzle used in an inkjet recording system.

The drying inhibitor is preferably a water-soluble organic solvent having a vapor pressure lower than water. Its concrete examples include polyalcohols such as typically ethylene glycol, propylene glycol, diethylene glycol, polyethylene glycol, thiodiglycol, dithiodiglycol, 2-methyl-1,3-propanediol, 1,2,6-hexanetriol, acetylene glycol derivative, glycerin, trimethylolpropane; polyalcohol lower alkyl ethers such as ethylene glycol monomethyl (or ethyl)ether, diethylene glycol monomethyl (or ethyl)ether, triethylene glycol monoethyl (or butyl)ether; heterocyclic compounds such as 2-pyrrolidone, N-methyl-2-pyrrolidone, 1,3-dimethyl-2-imidazolidinone, N-ethylmorpholine; sulfur-containing compounds such as sulfolane, dimethyl sulfoxide, 3-sulfolene; polyfunctional compounds such as diacetone alcohol, diethanolamine; and urea derivatives. Of those, more preferred are polyalcohols such as glycerin, diethylene glycol. One or more of the above drying inhibitors may be used either singly or as combined. The drying inhibitor may be in the ink preferably in an amount of from 10 to 50% by mass.

The penetration promoter is favorably used for the purpose of more rapidly penetrating the inkjet ink into paper. As the penetration promoter, usable are alcohols such as ethanol, isopropanol, butanol, di(tri)ethylene glycol monobutyl ether, 1,2-hexanediol; sodium laurylsulfate, sodium oleate, nonionic surfactant. When the agent is in the ink in an amount of from 5 to 30% by mass, then it is generally sufficiently effective. Preferably, the agent is used in an amount not causing print blur and print through.

The UV absorbent is used for the purpose of improving the image storability. The UV absorbent includes benzotriazole compounds as in JP-A 58-185677, 61-190537, 2-782, 5-197075, 9-34057; benzophenone compounds as in JP-A 46-2784, 5-194483, U.S. Pat. No. 3,214,463; cinnamic acid compounds as in UP-B 48-30492, 56-21141, JP-A 10-88106; triazine compounds as in JP-A 4-298503, 8-53427, 8-239368, 10-182621, JP-T 8-501291; and also the compounds described in Research Disclosure No. 24239, and compounds capable of absorbing UV rays to emit fluorescent light, or that is, fluorescent brighteners such as typically stilbene compounds and benzoxazole compounds.

The antifading agent is used for the purpose of improving the image storability. As the antifading agent, usable are various organic or metal complex-type antifading agents. The organic antifading agent includes hydroquinones, alkoxyphenols, dialkoxyphenols, phenols, anilines, amines, indanes, chromans, alkoxyanilines, and heterocyclic compounds; and the metal complex includes nickel complexes and zinc complexes. More concretely, herein usable are the compounds described in the patent references cited in Research Disclosure No. 17643, Items VII-I to J, ibid., No. 15162, ibid., No. 18716, page 650, left column, ibid., No. 36544, page 527, ibid., No. 307105, page 872, ibid., No. 15162; and the compounds falling within the scope of the typical compounds of the formula and the examples of the compounds described in JP-A 62-215272, pp. 127 to 137.

The rust inhibitor includes sodium dehydroacetate, sodium benzoate, sodium pyridinethione-1-oxide, ethyl p-hydroxybenzoate, 1,2-benzisothiazolin-3-one and its salts. Preferably, this is in the ink in an amount of from 0.02 to 1.00% by mass.

As the pH controlling agent, usable are neutralizing agents (organic base, inorganic alkali). For the purpose of improving the storage stability of the inkjet ink, the pH controlling agent is preferably added to the inkjet ink so that the ink could have a pH of from 6 to 10, more preferably from 7 to 10.

The surface tension controlling agent may be a nonionic, cationic or anionic surfactant. Preferably, the surface tension of the inkjet ink containing the coloring composition of the invention is from 20 to 60 mN/m, more preferably from 25 to 45 mN/m. The viscosity of the inkjet ink of the invention is preferably at most 30 mPa·s, more preferably so controlled as to be at most 20 mPa·s.

Preferred examples of the surfactant include anionic surfactants such as fatty acid salts, alkylsulfate ester salts, alkylbenzenesulfonic acid salts, alkylnaphthalenesulfonic salts, dialkylsulfosuccinic acid salts, alkylphosphate ester salts, naphthalenesulfonic acid/formalin condensates, polyoxyethylene alkylsulfate ester salts; and nonionic surfactants such as polyoxyethylene alkyl ethers, polyoxyethylene alkylaryl ethers, polyoxyethylene fatty acid esters, sorbitan fatty acid esters, polyoxyethylene sorbitan fatty acid esters, polyoxyethylene alkylamines, glycerin fatty acid esters, oxyethyleneoxypropylene block copolymers. Also preferred are SURFYNOLS (trade name by Air Products & Chemicals) that are acetylene-type polyoxyethylene oxide surfactants.

Also preferred are amine oxide-type ampholytic surfactants such as N,N-dimethyl-N-alkylamine oxide. Further usable herein are the surfactants described in JP-A 59-157636, pp. 37-38, and Research Disclosure No. 308119 (1989).

As the defoaming agent, optionally used herein are fluorine compounds, silicone compounds, and chelating agents such as EDTA.

In case where the dye of formula (1) is dispersed in an aqueous medium, it is desirable that coloring particles containing the compound and an oil-soluble polymer are dispersed in an aqueous medium as in JP-A 11-286637, 2001-240763, 2001-262039, 2001-247788, or the dye of formula (1) dissolved in a high-boiling-point organic solvent is dispersed in an aqueous medium as in JP-A 2001-262018, 2001-240763, 2001-335734, 2002-80772. Regarding the concrete method of dispersing the dye of formula (1) in an aqueous medium, as well as the oil-soluble polymer, the high-boiling-point organic solvent and the additives to be used, and their amounts those described in the above-mentioned patent references are employable herein. As the case may be, the bisazo compound may be dispersed as fine particles directly as it is solid. In dispersing them, a dispersant and a surfactant may be used.

As the dispersing device, usable are simple stirrers, and also impellers, in-line stirrer mills (e.g., colloid mill, ball mill, sand mill, attritor, roll mill, agitator mill), ultrasonic stirrers, high-pressure emulsification dispersers (high-pressure homogenizers; as commercial devices, available are Gaulin homogenizer, Microfluidizer, DeBEE 2000 (by BEE International)). Regarding the method of preparing the above-mentioned inkjet recording ink, its details are described also in JP-A 5-148436, 5-295312, 7-97541, 7-92515, 7-118584, 11-286637, 2001-271003, in addition to the above-mentioned patent references; and these descriptions are applicable to the preparation of the inkjet recording ink of the invention.

As the aqueous medium, usable is a mixture comprising water as the main ingredient and optionally containing a water-miscible organic solvent added thereto. Examples of the water-miscible organic solvent include alcohols (e.g., methanol, ethanol, n-propanol, isopropanol, butanol, isobutanol, sec-butanol, t-butanol, pentanol, hexanol, cyclohexanol, benzyl alcohol), polyalcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylenediamine), and other polar solvents (e.g., formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). Two or more of the above-mentioned water-miscible organic solvents may be combined for use herein.

[Color Filter]

The color filter of the invention is characterized by containing the dye of formula (1). For producing the color filter, employable is a method of first forming a pattern with a photoresist and then dying it; or a method of forming a pattern with a photoresist to which a colorant is added, as in JP-A 4-163552, 4-126703, 4-175753. As the method of introducing the dye of formula (1) into the color filter of the invention, any of the above methods is employable, but preferred is the method described in JP-A 4-175753, 6-35182. The method comprises applying a positive photoresist composition containing a thermosetting resin, a quinonediazide compound, a crosslinking agent, a colorant and a solvent, onto a support, then exposing it through a mask, developing the exposed area to form a positive resist pattern, then exposing the entire surface of the positive resist pattern to light, and thereafter curing the thus-exposed positive resist pattern to produce a color filter. Also employable is a method of forming a black matrix in an ordinary manner thereby obtaining an RGB primary color filter or an Y.M.C complementary color filter.

For the thermosetting resin, the quinonediazide compound, the crosslinking agent and the solvent to be used in the above and their amount, preferred are those described in the above-mentioned patent references.

EXAMPLES

The characteristics of the invention are described more concretely with reference to Production Examples and Examples given below.

In the following Examples, the material used, its amount and the ratio, the details of the treatment and the treatment process may be suitably modified or changed not overstepping the scope of the invention. Accordingly, the invention should not be limitatively interpreted by the Examples mentioned below.

Example 1

Production and Evaluation of Dye

<Production of Compound (1)>

Intermediate (A)

Compound (1)

(Production of Intermediate (A))

5-Amino-3-tert-butyl-1H-pyrazole-4-carbonitrile (19.9 g, 0.121 mol) was dissolved in acetic acid (25 mL), propionic acid (35 mL) and concentrated hydrochloric acid (36 mL), and cooled to an inner temperature of 0° C. With keeping the inner temperature at 5° C. or lower, a solution prepared by dissolving sodium nitrite (8.8 g) in water (18 mL) was gradually dropwise added to it; and after the addition, this was stirred at an inner temperature of from 0 to 5° C. for 30 minutes (diazo solution). Apart from it, 3'-(diethylamino) acetanilide (25 g) was dissolved in acetonitrile (800 mL), and cooled to an inner temperature of 10° C. or lower; and the diazo solution prepared in the above was gradually added to it. This was stirred at an inner temperature of not higher than 10° C. for 1 hour and then at room temperature for 1 hour, and the precipitated crystal was taken out by filtration and washed with acetonitrile to obtain a yellow crystal of the intermediate (A) (yield: 38.4 g, 83.2%)

(Production of Compound (1))

The intermediate (A) (5.7 g, 0.015 mol), N,N-dimethylacetamide (75 mL), triethylamine (8 mL) were mixed, then cooled to an inner temperature of 5° C. or lower, and methanesulfonyl chloride (15 mL) was dropwise added, then stirred at 35 to 45° C. for 7 hour. The reaction liquid was poured into water, the precipitated crystal was taken out by filtration, and recrystallized with acetonitrile to obtain a powder of the compound (1) (yield: 2.6 g, 43%; melting point: 205° C.).

λmax of the compound (1) (in ethyl acetate solution) was 541 nm.

<Production of Compounds (2), (5) and (10)>

Compounds (2), (5) and (10) were produced according to the method of the above Production Example. Other compounds than the compounds (1), (2), (5) and (10) may also be produced according to the method of the above-mentioned Production Example from the chemical viewpoint.

<Evaluation>

The thus-obtained compounds (1), (2), (5) and (10) were analyzed absorption spectroscopy in an ethyl acetate solution (concentration: $1 \times 10^{-6}$ mol/L, optical path length: 10 mm). The data of the maximum absorption wavelength of the compounds are shown in the following Table 1.

TABLE 1

| Dye | Maximum Absorption Wavelength (nm) |
|---|---|
| (1) | 541 |
| (2) | 548 |
| (5) | 539 |
| (10) | 506 |

Example 2

Construction and Evaluation of Thermal Transfer Recording Ink Sheet

<Construction of Thermal Transfer Recording Ink Sheet>

A polyester film (Lumirror, trade name by Toray) having a thickness of 6.0 μm and processed for heat-resistant lubrication with a thermosetting acrylic resin (thickness 1 µm) on its back was used as a support. Using a wire bar coater, a dye-donating layer-forming coating composition mentioned below was applied onto the surface of the film to form thereon a layer having a dry thickness of 1 µm, thereby constructing an ink sheet 1.

| (Dye-Donating Layer-Forming Coating Composition) | |
|---|---|
| Compound (1) | 5.5 mas. pts. |
| Polyvinylbutyral Resin (Eslec BX-1, trade name by Sekisui Chemical Industry) | 4.5 mas. pts. |
| Methyl ethyl ketone/toluene (1/1) | 90 mas. pts. |

Next, ink sheets 2 to 4 of the invention and comparative ink sheets 5 to 7 were constructed in the same manner as that for the ink sheet 1, for which, however, the compound (1) was changed to the dye shown in Table 2 below. The dye solubility was ranked in three, A (easily soluble), B (soluble) r C (difficult to dissolve, but soluble). The results are shown in Table 2.

<Construction of Image-Receiving Material>

Synthetic paper (Yupo FPG200, trade name by Yupo Corporation, thickness: 200 µm) was used as a support. A white interlayer-forming coating composition and a receiving layer-forming coating composition mentioned below were applied in that order onto one surface of the support, using a bar coater. Their amount was so controlled that the white interlayer could have a dry thickness of 1.0 g/m² and the receiving layer could have a dry thickness of 4.0 g/m². The layers were dried at 110° C. for 30 seconds each.

| (White Interlayer-Forming Coating Composition) | |
|---|---|
| Polyester resin (Vylon 200, trade name by TOYOBO) | 10 mas. pts. |
| Fluorescent brightener (Uvitex OB, trade name by Ciba-Geigy) | 1 mas. pt. |
| Titanium oxide | 30 mas. pts. |
| Methyl ethyl ketone/toluene (1/1) | 90 mas. pts. |
| (Receiving Layer-Forming Coating Composition) | |
| Vinyl chloride-vinyl acetate resin (Solbine A, trade name by Nisshin Chemical Industry) | 100 mas. pts. |
| Amino-modified silicone (X22-3050C, trade name by Shin-etsu Chemical Industry) | 5 mas. pts. |
| Eposy-modified silicone (X22-300E, trade name by Shin-etsu Chemical Industry) | 5 mas. pts. |
| Methyl ethyl ketone/toluene (=1/1) | 400 mas. pts. |
| Benzotriazole-type UV absorbent (Tinuvin 900, trade name by Ciba Speciality Chemicals) | 5 mas. pts. |

<Image Recording and Evaluation>

The ink sheet 1 and the image-receiving material constructed as above were combined in such a manner that the dye-donating layer could face the image-receiving layer, and this was printed using a thermal head applied to the back of the dye-donating material. The output power of the thermal head was 0.25 W/dot, pulse width was from 0.15 to 15 msec, the dot density was 6 dots/mm. In that manner, the magenta dye was imagewise fixed on the image-receiving layer of the image-receiving material, and as a result, a sharp image print with no transfer unevenness was obtained. The ink sheets 2 to 8 were used in place of the ink sheet 1, tested for image recording.

The solid density (100% dot density) of each image was measured as the status A reflection density thereof, and the samples were evaluated for their transferability in 3 ranks, as follows: Those having a reflection density of at least 1.8 are excellent, A; those having from 1.6 to less than 1.8 are good, B; those having from 1.0 to less than 1.6 are average, C. The results are shown in Table 2 below.

Next, the recorded samples were exposed to an Xe light (17000 lux) for 7 days, and tested for the light stability (light fastness) of the recorded images. After the exposure, the status A reflection density of the part of each sample having an original status A reflection density of 1.0 before the exposure was measured, and the retention (by percentage) to the reflection density of 1.0 after exposure to that before exposure indicates the image stability. With the retention percentage, the samples were ranked in three, A (from 80% to less than 100%), B (from 60% to less than 80%), C (less than 60%). The results are shown in Table 2 below.

TABLE 2

| Ink Sheet | Dye | Solubility | Transferability | Light Fastness | Remarks |
|---|---|---|---|---|---|
| 1 | (1) | A | A | A | the Invention |
| 2 | (2) | A | A | A | the Invention |
| 3 | (5) | A | A | A | the Invention |
| 4 | (10) | A | A | A | the Invention |
| 5 | Comparative Dye 1 | B | A | C | Comparative Example |
| 6 | Comparative Dye 2 | B | A | B | Comparative Example |
| 7 | Comparative Dye 3 | B | B | C | Comparative Example |

Comparative Dye 1 (similar to Dye 9 in U.S. Pat. No. 4,764,178):

Comparative Dye 2 (similar to Dye 9 in U.S. Pat. No. 4,764,178):

Comparative Dye 3 (Compound 1 in JP-A 4-265797):

As a result of the above image recording test, it is known that the images transferred onto the image-receiving layer from the ink sheets having the azo dye of formula (1) of the invention has a sharp color, and as compared with those from the comparative dyes, the images have more improved stability to light and have excellent image storability.

Unexpectedly, in addition, it is known that, as compared with the comparative dyes, the azo dyes of formula (1) of the invention have more excellent solubility, and therefore can greatly reduce the load in dissolution in ink sheet construction, and that the transfer sensitivity of the dyes is excellent and therefore the dyes can solve both the problems of the solubility and the transferability that have heretofore been said difficult to solve.

Example 3

Formation and Evaluation of Color Toner

<Formation of Color Toner>
3 parts by mass of an azo dye of the invention (compound (1)) and 100 parts by mass of a toner resin [styrene-acrylate copolymer, Himer TB-1000F (trade name by Sanyo Chemical)] were mixed and ground in a ball mill, then melted and kneaded under heat at 150° C., and after cooled, this was roughly ground with a hammer mill, and then finely ground with an air jet-type grinder. Further classified, particles of from 1 to 20 μm in size were selected to be a toner.
<Evaluation>
10 parts by mass of the toner was uniformly mixed with 900 parts by mass of a carrier iron powder (EFV250/400, trade name by Nippon Iron Powder) to prepare a developer. The developer was tested for copying with a dry-type plain paper electrophotographic copier (NP-5000, trade name by Canon). As a result, the developer had excellent spectral characteristics and had excellent properties as toner.

Example 4

Formation and Evaluation of Inkjet Ink

<Formation of Inkjet Ink>
An azo dye of the invention (compound (1)) (5.63 g) and sodium dioctylsulfosuccinate (7.04 g) were dissolved in a high-boiling-point organic solvent mentioned below (S-2) (4.22 g), a high-boiling-point organic solvent mentioned below (S-11) (5.63 g) and ethyl acetate (50 ml) at 70° C. With stirring with a magnetic stirrer, deionized water (500 ml) was added to the solution to produce an oil-in-water crude particle dispersion.

Next, the crude particle dispersion was led to pass through a microfluidizer (by MICROFLUIDEX INC) five times under a pressure of 60 MPa to be fine particles, and the thus-prepared emulsion was evaporated for solvent removal with a rotary evaporator until it gave no ethyl acetate odor.

Diethylene glycol (140 g), glycerin (50 g), SURFYNOL 465 (trade name by Air Products & Chemicals) (7 g) and deionized water (900 ml) were added to the fine emulsion of the hydrophobic dye thus obtained as above, thereby producing an inkjet ink.

Figure 1:
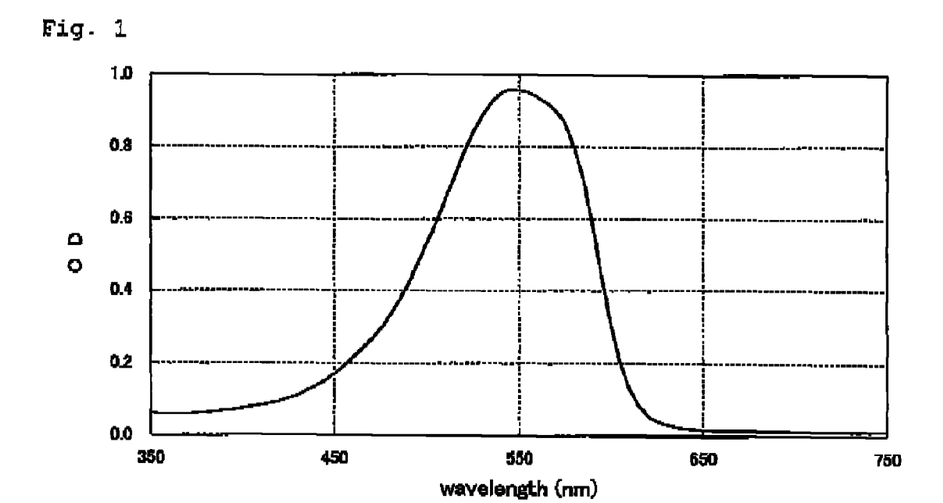
FIG. 1 is a reflection spectrum of the image obtained in the inkjet recording in the example.

<Evaluation>
The thus-obtained ink was filled in a cartridge of an inkjet printer (PM-G800, trade name by Seiko Epson), and tested in the printer for image recording on inkjet paper, Kassai Photofinish Pro (trade name by FUJIFILM). The reflection spectrum of the thus-formed image is shown in FIG. 1. As is obvious from the data in FIG. 1, it is known that the obtained image has excellent spectral characteristics and the ink has excellent properties as inkjet ink.

Example 5

Construction and Evaluation of Color Filter

Figure 2:
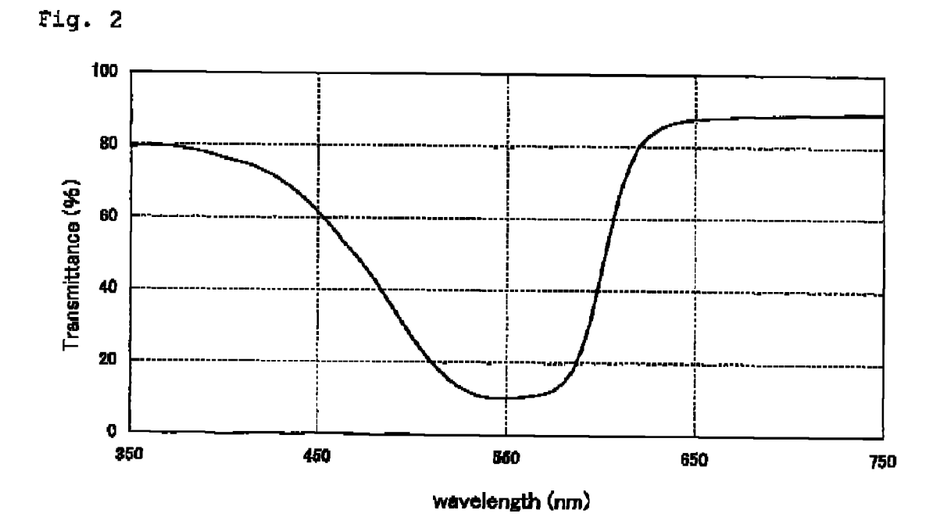
FIG. 2 is a transmission spectrum of the color filter produced in the example.

<Construction of Color Filter>
(Preparation of Positive Resist Composition)
3.4 parts by mass of cresol/novolak resin obtained from a mixture of m-cresol/p-cresol/formaldehyde (reaction molar ratio=5/5/7.5) (polystyrene-based mass-average molecular weight, 4300), 1.6 parts by mass of o-naphthoquinonediazido-5-sulfonate ester produced by the use of a phenol compound having a formula mentioned below (in which 2 hydroxyl groups were esterified on average), 0.8 parts by mass of hexamethoxymethylolated melamine, 20 parts by mass of ethyl lactate, and 1 part by mass of the compound (1) were mixed to produce a positive resist composition.
Phenolic Compound:

(Construction of Color Filter)
The obtained positive resist composition was applied onto a silicon wafer in a mode of spin coating, and the solvent was evaporated away. Next, the silicon wafer was exposed to light through a mask to decompose the quinonediazide compound. Next, this was heated at 100° C. and then the exposed area was removed by alkali development to obtain a positive color pattern having a resolution of 0.8 μm. This was exposed on the entire surface, and then heated at 150° C. for 15 minutes to produce a magenta-complementary color filter. For the exposure, used was an i-ray exposure stepper HITACHI LD-5010-i (trade name by Hitachi, NA 0.40). As the developer, used was SOPD or SOPD-B (trade name by Sumitomo Chemical Industry).
<Evaluation>
The transmission spectrum of the obtained color filter is shown in FIG. 2. As is obvious from the data in FIG. 2, the obtained color filter has excellent spectral characteristics and light transmittance, and has excellent properties as color filter.

According to the invention, there are provided a novel azo dye having excellent spectral characteristics with sharp absorption, high fastness and excellent solubility, and a coloring composition containing the azo dye. According to the invention, there are also provided a thermal transfer recording ink sheet and a thermal transfer recording method capable of satisfying all the requirements of excellent color reproducibility, image storability and transfer sensitivity in print samples. The ink sheet is excellent in that the working load and the environmental load in producing it are greatly reduced. Further, the invention provides a color toner, an inkjet ink and a color filter comprising the azo dye. Accordingly, the invention is expected to be effectively used in high-quality full color recording, and its industrial applicability is great.

The present disclosure relates to the subject matter contained in Japanese Patent Application No. 092233/2007 filed on Mar. 30, 2007, which is expressly incorporated herein by reference in its entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A coloring composition containing an azo dye of the following formula (1):

(1)

wherein $R^1$ and $R^2$ each independently represents an unsubstituted aliphatic group having from 1 to 10 carbon atoms, $R^3$ and $R^6$ each independently represents a monovalent substituent; $R^5$ represents a hydrogen atom or a monovalent substituent; n indicates an integer of from 0 to 4; when n is 2 or more, plural $R^3$'s may be the same or different; and $R^1$ and $R^2$ may bond to each other to form a cyclic structure.

2. A thermal transfer recording ink sheet containing the azo dye of claim 1.

3. A thermal transfer recording method comprising forming an image by utilizing the thermal transfer recording ink sheet of claim 2 on an image-receiving material comprising a polymer-containing ink-receiving layer on a support.

4. A color toner containing the azo dye of claim 1.

5. An inkjet ink containing the azo dye of claim 1.

6. A color filter containing the azo dye of claim 1.

7. An azo dye of the following formula (2):

(2)

wherein $R^1$ and $R^2$ each independently represents an unsubstituted aliphatic group having from 1 to 10 carbon atoms, $R^3$, $R^4$ and $R^6$ each independently represents a monovalent substituent; $R^5$ represents a hydrogen atom or a monovalent substitutent; m indicates an integer of from 0 to 3; when m is two or more, plural $R^3$'s may be the same or different; and $R^1$ and $R^2$ may bond together to form a cyclic structure.

8. The coloring composition according to claim 1, wherein $R^1$ and $R^2$ each independently represents an unsubstituted aliphatic group having from 1 to 4 carbon atoms.

9. The coloring composition according to claim 1, wherein $R^5$ represents a tert-butyl group.

10. The azo dye according to claim 7, wherein $R^1$ and $R^2$ each independently represents an unsubstituted aliphatic group having from 1 to 4 carbon atoms.

11. The azo dye according to claim 7, wherein $R^5$ represents a tert-butyl group.

* * * * *